Aug. 29, 1967  L. A. LONG  3,338,722
PACKAGED PASTRY
Original Filed Sept. 6, 1963
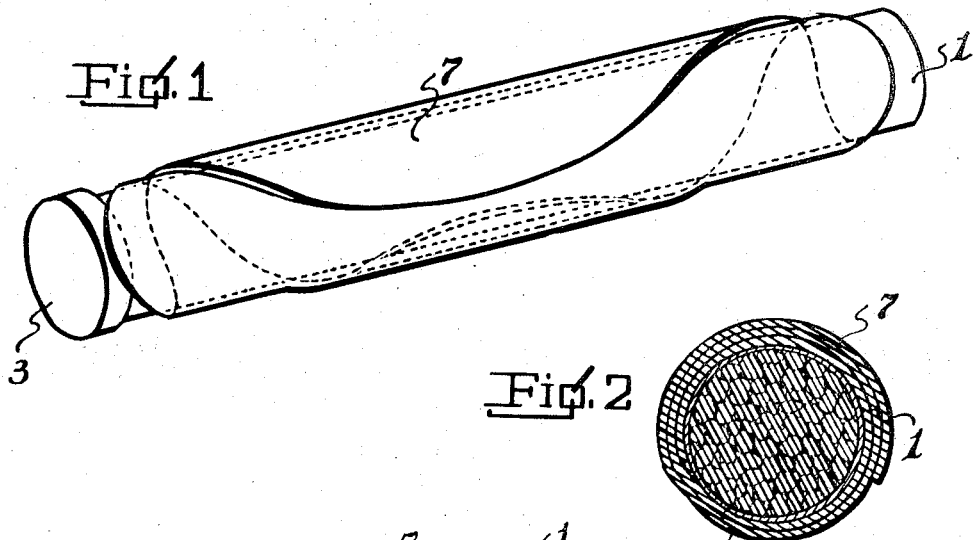
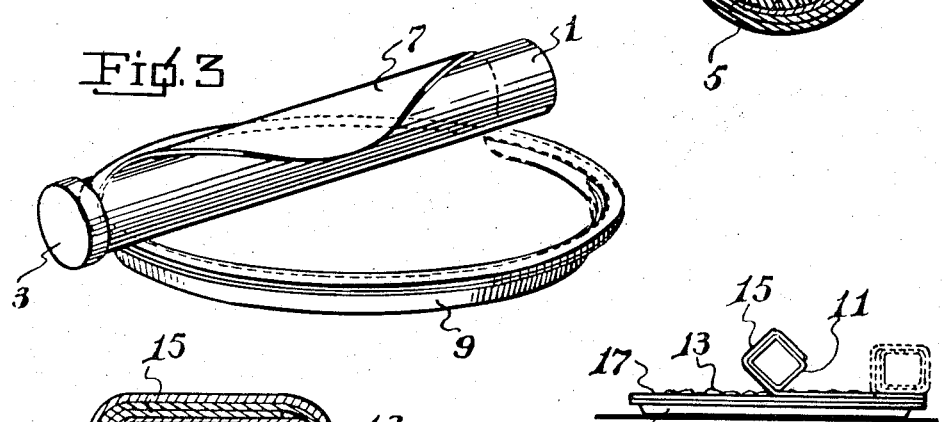
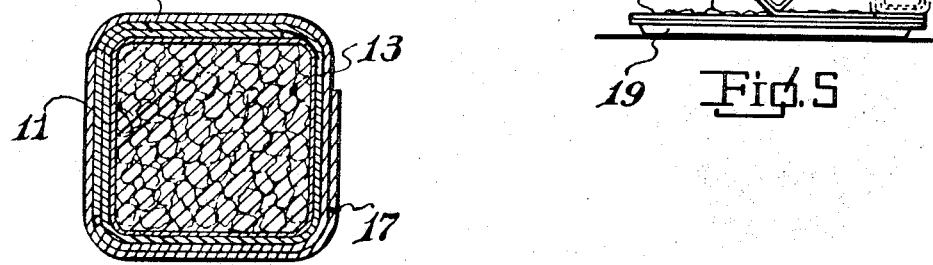
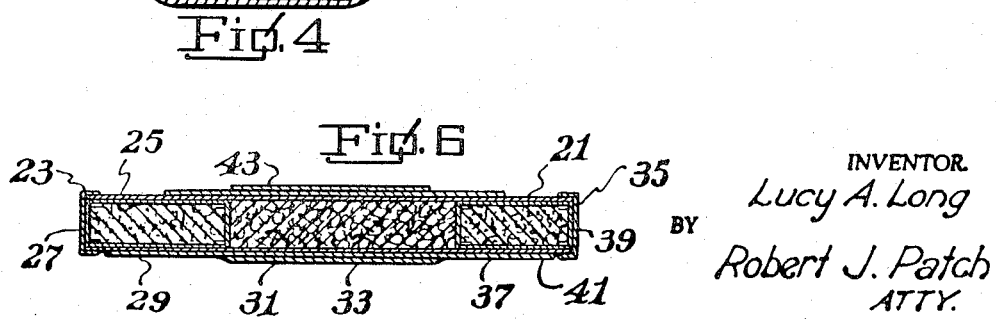
INVENTOR.
*Lucy A. Long*
BY *Robert J. Patch*
ATTY.

United States Patent Office 3,338,722
Patented Aug. 29, 1967

3,338,722
PACKAGED PASTRY
Lucy A. Long, Ventura, Calif.
(% Shilling, 4130 7th Place, Des Moines, Iowa 50313)
Continuation of abandoned application Ser. No. 307,130, Sept. 6, 1963. This application June 21, 1965, Ser. No. 470,307
2 Claims. (Cl. 99—172)

This application is a continuation of application Ser. No. 307,130, filed Sept. 6, 1963, now abandoned.

The present invention relates to packaged pastry, more particularly to packages of pastry in convenient form for rapid preparation of a finished pastry. The present invention thus deals with pastry in an intermediate stage of preparation, between initial compounding and final preparation. Pastries according to the present invention are ordinarily in such condition that they are ready to bake with a minimum of further work; but it is to be expressly understood that the invention is not limited to pastries that have to be baked to complete their preparation: in some cases pastries according to the present invention will need refrigeration after assembly, while in other cases pastries according to the present invention can be served as assembled without either heating or cooling.

The present invention has perhaps its largest field of application in the presentation of packaged pies ready to be assembled and baked, whether of the single crust or open-faced type, or of the double crust or closed type. Pies according to the present invention, therefore, include fruit pies, whether closed or open-faced or provided with a latticed upper crust, cream pies, ice box pies, custard pies, meringue pies, meat pies, vegetable pies, pizza pies, and the like. However, it is to be expressly understood that a variety of other pastries are amenable to presentation by the present invention. These include cobblers, cheese cake, topped or filled cookies and other small pastries such as barquettes, cream puffs, napoleons, etc. A common characteristic of pastries according to the present invention is that they include at least one slab of dough and at least one other component on top of the dough.

It is an object of the present invention to provide packaged pastries which occupy a minimum of storage space both in the store and in the home or other place of food service.

Another object of the present invention is the provision of packaged pastries which are more convenient to assemble into final form.

Still another object of the present invention is the provision of packaged pastries the components of which perform a plurality of diverse functions.

It is also an object of the present invention to provide packaged pastries that in their finished form duplicate pastries all of the steps of the creation of which have been performed in the home immediately prior to serving, that is, which are indistinguishable from "homemade" pastries.

A still further object of the present invention is the provision of packaged pastries, the preparation of which requires no utensils or dishes other than a single pan.

Yet another object of the present invention is the provision of packaged pastries in which plural slabs of dough are presented for easy and convenient use.

The invention also comprehends packaged pastries in which a plurality of filling components are presented for easy and convenient use.

Finally, it is an object of the present invention to provide packaged pastries which will be relatively simple and inexpensive to manufacture and pack, easy to store for long periods of time with no decrease in freshness, quality or flavor, which will be simple, fast and fool-proof to prepare, and which will be uniformly pleasing in texture and delicious in taste in their final form.

Other objects and advantages of the present invention will become apparent from a consideration of the following description, taken in connection with the accompanying drawings, in which:

FIGURE 1 is a perspective view of a packaged pastry according to the present invention;

FIGURE 2 is a view in transverse cross section through the pastry of FIGURE 1;

FIGURE 3 is a view of the pastry of FIGURES 1 and 2 at an intermediate stage of converting it into final form;

FIGURE 4 is a view similar to FIGURE 2 but showing a modified form of the invention;

FIGURE 5 is an elevational view of the embodiment of FIGURE 4 in use; and

FIGURE 6 is a cross-sectional view of still another embodiment of the present invention.

Referring now to the drawing in greater detail, there is shown in FIGURES 1–3 a first embodiment of the invention comprising an elongated cylindrical container 1 having a closure 3 at one end thereof. Container 1 contains a quantity of prepared pie filling 5 such as fruit in sugar syrup or any other variety of pie filling. Pie filling 5 is sealed in container 1 by closure 3 in such a manner that it cannot leak out or be exposed to the atmosphere.

A circular pie crust 7 in the form of a thin circular slab of uncooked pie dough is rolled up on the exterior of container 1. Preferably, pie crust 7 is of a diameter a little less than the length of container 1, so that the ends of container 1 project endwise beyond rolled-up pie crust 7 and serve to protect pie crust 7 against damage. Pie crust 7 in its uncooked state will of course be rather limp and flexible, and it is preferred that container 1 be rigid so as to protect pie crust 7 against deformation prior to use. An outer packaging material (not shown) will ordinarily encompass the assembly of container 1, end closure 3, pie filling 5 and pie crust 7. It is preferred that this wrapping material be thin transparent material such as acetate film or rubber hydrochloride film or the like so that the unique construction and mode of use of the packaged pastry of the present invention will be apparent at a glance from the shopper. Of course, if desired, a rigid outer container can also be used so as to protect limp pie crust 7 from deformation. On the other hand, if the packaged pastry is frozen, then pie crust 7 will be rigid and will not be subject to casual deformation until it is thawed in preparation for use.

FIGURE 3 shows the mode of use of a packaged pastry of the present invention when it is desired to complete preparation of it and serve it for eating. To prepare the packaged pastry of the present invention, it is necessary only to use a pie pan 9. Container 1 with pie filling inside it and pie crust outside it is placed with its midportion on the edge of pie pan 9 and pie crust 7 is simply unrolled over the pan. In this manner, it is very easy to put a limp circular unbaked lower crust into a pie pan. After pie crust 7 is unrolled onto pan 9, and appropriately pushed down into the pan, then closure 3 is removed from container 1 and pie filling 5 is emptied into the pie crust 7. The unbaked pie can then be put into the oven for baking and the completed pie is thereafter ready to be eaten. Empty container 1 is simply thrown away, and there are no dishes or utensils to wash other than the pie pan after the pie has been cut and served.

A slightly different embodiment of the present invention is shown in FIGURES 4 and 5. In those figures, a container 11 is shown which is elongated but which is roughly square in cross-sectional configuration. Container 11 is filled with pie filling 13, and on the outside of container 11 an upper pie crust 15 is wrapped about container 11 in contact with the outside of container 11, while a lower pie crust 17 is wrapped about upper pie crust 15. Upper and lower pie crusts 15 and 17 are in tandem with each other, that is, upper pie crust 15 is entirely wrapped about container 11 before lower pie crust 17 is wrapped about crust 15. In other words, the trailing edge of lower pie crust 17 does not overlap the leading edge of upper pie crust 15 with regard to the direction of unrolling crusts 15 and 17 from container 11.

The square configuration of container 11 saves space both for retail storage and home storage and does not hinder the use of the packaged pastry in any way. FIGURE 5 shows why this is so. Crusts 15 and 17 can be unrolled from square container 11 just as easily as from cylindrical container 1 as the crusts are applied to form a pie in pie pan 19. Thus, in the assembly of the pie of FIGURES 4 and 5, lower crust 17 is first unrolled from container 11; then the contents of container 11 are emptied into pie pan 19 on top of lower crust 17, after which the second or upper pie crust 15 is unrolled to cover the pie filling 13. The edges of crusts 15 and 17 can then be fluted, steam vents cut in the upper crust, and the pie baked.

Another form of packaged pastry according to the present invention is shown in cross section in FIGURE 6 in the form of a pizza pie. As is there shown, an elongated cylindrical container 21 is provided at one end with a closure 23. Inside one end of container 21 behind closure 23 is a relatively short cylindrical container 25 which in turn has a closure 27 at the end thereof adjacent closure 23. A quantity of cheese 29 is contained in container 25.

To the right of container 25 as seen in FIGURE 6 is a compartment 31 formed by the interior of container 21. Compartment 31 is filled with meat or tomato paste 33 or other pizza pie component.

At the right of FIGURE 6, container 21 is provided with a second end closure 35, and within the right-hand end of container 21 immediately behind closure 35 is a second relatively short cylindrical container 37 which in turn is closed by a closure 39 at its end adjacent closure 35. A quantity of chopped topping 41 or other pizza component, in the form of chopped mushrooms, chopped onions, chopped anchovies, etc., is contained within relatively short container 37. A pizza pie crust 43 is rolled up about the outside of container 21.

To use the prepared pastry of FIGURE 6, it is necessary only to unroll pizza pie crust 43 onto a pizza pie pan, after which the contents of containers 25 and 37 and compartment 31 can be applied as desired on top of the crust and the open-faced pizza pie placed in an oven and baked.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A packaged pastry comprising an elongated container with a pastry filling inside the container being of substantially uniform cross-sectional configuration along its length, closure means at both ends of the container, at least one of said closure means being removable to empty the filling from the container, at least one slab of pastry dough rolled up on the outside of the container, and packaging material encompassing the assembly of the pastry dough and the closure means.

2. A packaged pastry as claimed in claim 1, there being a pair of slabs of pie dough rolled up in tandem on the container.

References Cited
UNITED STATES PATENTS

| | | | |
|---|---|---|---|
| 1,710,164 | 4/1929 | Hefler. | |
| 1,873,716 | 8/1932 | Nickerson | 99—172 X |
| 3,015,429 | 1/1962 | Morici | 99—172 X |
| 3,144,340 | 8/1964 | Powers | 99—92 |
| 3,228,775 | 1/1966 | Johnson | 99—192 X |

RAYMOND N. JONES, *Primary Examiner.*